(12) United States Patent
Arhab

(10) Patent No.: US 6,176,362 B1
(45) Date of Patent: Jan. 23, 2001

(54) TORSIONAL DAMPER FOR LOCKING CLUTCH PERTAINING TO A HYDROKINETIC COUPLING APPARATUS, IN PARTICULAR FOR MOTOR VEHICLE

(75) Inventor: Rabah Arhab, St. Brice S/Foret (FR)

(73) Assignee: Valeo, Paris (FR)

(*) Notice: Under 35 U.S.C. 154(b), the term of this patent shall be extended for 0 days.

(21) Appl. No.: 09/242,319

(22) PCT Filed: Jun. 17, 1998

(86) PCT No.: PCT/FR98/01276

§ 371 Date: Sep. 23, 1999

§ 102(e) Date: Sep. 23, 1999

(87) PCT Pub. No.: WO98/58191

PCT Pub. Date: Dec. 23, 1998

(30) Foreign Application Priority Data

Jun. 17, 1997 (FR) .................................................. 97 07479

(51) Int. Cl.[7] ...................................................... F16D 35/00
(52) U.S. Cl. ........................ 192/213.1; 192/3.28; 464/63; 464/64; 464/67; 464/68
(58) Field of Search .................................. 192/3.29, 3.3, 192/3.28, 212, 213, 213.1, 213.2; 464/63, 64, 67, 68

(56) References Cited

U.S. PATENT DOCUMENTS 5,105,680  4/1992  Naudin .

5,782,694 * 7/1998  Honjo ........................................ 464/64

FOREIGN PATENT DOCUMENTS 0286213  10/1988  (EP) .
2549180   1/1985  (FR) .
2695975   3/1994  (FR) .

OTHER PUBLICATIONS

International Search Report for PCT/FR98/01276.

* cited by examiner

*Primary Examiner*—Rodney H. Bonck
*Assistant Examiner*—Saúl Rodriguez
(74) *Attorney, Agent, or Firm*—Liniak, Berenato, Longacre & White

(57) ABSTRACT

The invention concerns a torsional damper (23) comprising an input element and an output element coaxial and movable in rotation relative to each other counter at least to an compression spring (300), wherein the two adjacent transverse parts, with radial orientation, associated with the input and output elements each comprise a housing (306–308, 302) receiving the spring (300) whereof the opposite ends are capable of co-operating with the supporting end surfaces (316–318, 304) which define the two housings to operate between the two elements; the length (LF) of each of the two associated housings (306–308, 302), separating the opposite supporting end surfaces, being greater than the length (LR) of the spring (300) at rest.

10 Claims, 5 Drawing Sheets

TORSIONAL DAMPER FOR LOCKING CLUTCH PERTAINING TO A HYDROKINETIC COUPLING APPARATUS, IN PARTICULAR FOR MOTOR VEHICLE

The present invention relates to a torsion damper.

In particular, the invention relates to a torsion damper for a lock-up clutch which is adapted to work between the driving element and the driven element of a hydrokinetic coupling apparatus, especially for a motor vehicle.

In accordance with a known design, the torsion damper comprises an input element and an output element which are coaxial with each other and rotatable with respect to each other against the action of at least one compression spring.

The spring or springs are generally of the circumferentially acting type, being for example arranged substantially on a common diameter.

More precisely, the damper comprises two adjacent, radially oriented, transverse parts which are associated with the two elements, namely the input element and the output element respectively, and each of which includes a housing that receives the spring, the opposed ends of which are arranged to cooperate with the end abutment surfaces bounding the two housings for acting between the two elements.

Regardless of the type of arrangement used for the springs, it may be necessary to provide an angular course of dead travel CM between the input and output elements before the springs start to operate.

For this purpose, and in accordance with one known design which is indicated diagrammatically in FIG. 6A, one of the two housings, which are generally configured in the form of windows having contours substantially complementary with that of the spring, which is for example a coil-type compression spring, have a length which is substantially equal to that of the spring, while the other one has a window length LF which is generally greater than the length LR of the spring, whereby to make available, with reference to a rest position in which the spring is centred in the larger of the windows, a course of dead travel CM in each of the two directions of rotation, which is equal to one half of the difference in length LF-LR.

It is important, especially for good absorption of vibrations, to be able to provide a course of dead travel of substantial length, more particularly when the springs are springs of the so-called "second order" type, that is to say in the case where they are part of a second set of springs which act over a second period after a first set of springs of the so-called "first order" type has already acted circumferentially between the input and output elements.

In this connection, the second order springs are in some arrangements disposed radially inwardly, and the space available for mounting the springs, and more particularly for forming the windows that constitute the housings which receive them, is reduced.

It is therefore desirable, for example in the case where the springs are arranged circumferentially in a series along a common diameter, to be able to provide the greatest possible number of springs with the greatest possible angular course of dead travel, while having good mechanical strength.

With this in view, the invention proposes a torsion damper of the type mentioned above, characterised in that the length of each of the two associated housings, separating the opposed end abutment surfaces of the housing, is greater than the length of the spring at rest.

Thanks to this design, and for example in the case where the lengths of the two associated housings are equal—for the same spring length LR—the same course of dead travel CM is available, in both directions of rotation, as in the solution according to the state of the art with windows the length LF of which is reduced by a course of dead travel CM.

Thus, for the same desired course of dead travel, it is possible to provide more springs or, for the same number of springs, the components in which the windows constituting the housings are formed are more rigid because there is more material present between two consecutive windows.

The two adjacent portions of the inlet and outlet elements, in which the housings are formed, generally consist of two radially oriented, transverse and substantially flat portions.

Where the springs are second order springs arranged circumferentially on a diameter, each housing is preferably a window formed in the corresponding flat portion of the element, and the end abutment surfaces consist of the opposed terminal lateral edges of the window.

The spring is preferably a coil type compression spring.

The two adjacent parts may be, respectively, part of the input element and output element, the housings being circumferentially oriented housings which receive a circumferentially acting spring.

In this last mentioned case, the damper includes a set of circumferentially acting springs arranged substantially on a common diameter, and each of which is received in two associated housings according to the invention.

The input element comprises at least one guide ring which retains the circumferentially acting springs in position radially and which is coupled to the driven element of the lock-up clutch, and the output element comprises a radial plate or web which is coupled in rotation to the driving element of the lock-up clutch.

The input element may comprise two complementary guide rings, each of which includes a radially oriented transverse portion, the two said portions being arranged symmetrically on either side of a corresponding radially oriented transverse portion of the radial plate, the said two guide ring portions including facing windows which, being associated in pairs, constitute a housing of the input element which receives a circumferentially acting spring, which is itself received in a housing of the portion of the radial plate that extends between the two rings.

The two complementary rings include means for coupling them together in rotation, and the circumferentially acting springs, referred to as second order springs, are arranged on a diameter which is substantially smaller than the diameter on which the means coupling the two rings together in rotation are located.

Further features and advantages of the invention will appear on a reading of the following detailed description, for an understanding of which, reference will be made to the attached drawings, in which.

Figure 1:
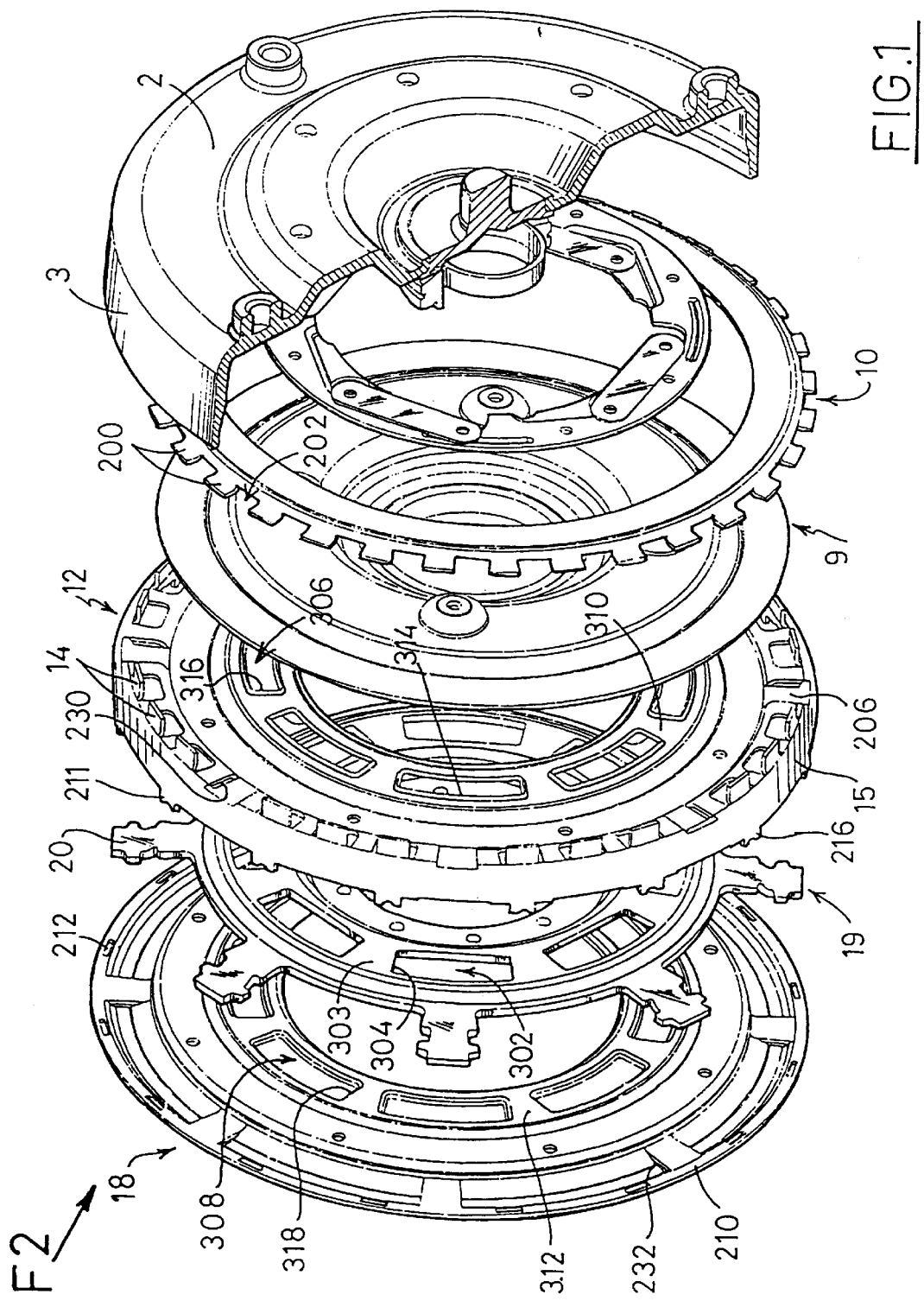
FIG. 1 is an exploded perspective view, shown partly cut away, of the main components of a hydrokinetic coupling apparatus including a torsion damper in accordance with the features of the invention.

In one design, which is known for example from the document WO-A-94/07058 (U.S. Pat. No. 4,590,750), to which reference can be made for more detail, a hydrokinetic coupling apparatus includes, arranged in a common sealed housing filled with oil and constituting a casing, a torque converter and a lock-up clutch 1.

The casing, which in this example is of metal, constitutes a driving element and it is arranged to be coupled in rotation to a driving shaft, for example a crankshaft of an internal combustion engine (not shown) in the case of application to a motor vehicle.

The casing, which is of generally annular form, consists of two half shells which are arranged facing towards each other and which are fixed in a sealed manner at their outer periphery, usually by a welding operation.

The first shell 2, 3 is arranged to be coupled in rotation to the driving shaft, and it consists essentially of an annular wall 2 which is oriented generally transversely, that is to say it lies in a radial plane at right angles to the axis X—X of the apparatus, and it is extended at its outer periphery by a generally axially oriented annular cylindrical wall 3.

The second shell (not shown in the drawings in the interests of simplicity, the same being true for the reaction wheel of the converter) is so configured as to define an impulse wheel with vanes projecting from the inner face of that half shell. These vanes lie facing towards the vanes of the turbine wheel 4 which is secured by riveting or welding to a hub plate 102 coupled in rotation with a hub 5, which is splined internally for coupling it in rotation to a driven shaft (not shown), which may for example be the input shaft of the gearbox in the case of application to a motor vehicle.

The driven shaft is hollow so as to define an internal duct that provides access for oil to a guide sleeve 6, which in this example is solid and which is fitted axially between the hub 5 and the transverse wall 2. The guide sleeve consists of a front portion 106 which acts as a centring device, and a rear portion 108. The portion of the guide sleeve 6 having the smaller diameter is the front portion 106, the function of which is to provide fastening of the guide sleeve 6 to the transverse wall 2, in this example by welding, while the rear portion 108, having the larger diameter, is bounded radially on the outside by a machined cylindrical surface 110 for the axial sliding guidance of a piston 9, which has for this purpose a central, axially oriented sleeve portion 112 which in this example is directed axially towards the rear, that is to say towards the plate 102 of the splined hub 5.

The surface 110 includes a groove which receives an annular sealing ring (not given a reference numeral) for sealing the sliding movement of the sleeve portion 112 along the surface 110. The hub 5 has a front portion which penetrates into the interior of the sleeve 6.

In accordance with a known design, the piston 9 defines, with the guide sleeve 6, the transverse wall 2 and an annular disc 10 (which carries friction liners 11, secured for example by adhesive bonding on each of its transverse opposed faces) defines a variable volume chamber 30 which is fed through the guide sleeve 6, which has holes for this purpose (not given a reference numeral).

The disc 10 is fitted at the outer periphery of the piston 9, and at its outer periphery, radially beyond the piston 9, it has lugs with a radially oriented portion 200 formed with notches 202, into each of which there penetrates an axially oriented drive lug 14 formed in the outer part of an external guide ring 12.

The disc 10 is carried by the ring 12, and is thereby coupled in rotation to the guide ring 12, but with axial movement being possible, by means of a coupling 13 of the tenon and mortice type comprising the lugs 14 and notches 202.

The lugs 14 are oriented axially, and are formed by stamping and bending so as to project from the generally transversely oriented portion 206 of the external guide ring 12, which in this example is a metal ring.

The lugs 14 extend axially towards the internal face 124 of the transverse wall 2.

The transverse portion 206 is extended at its outer periphery by an axially oriented annular portion 15 in the form of an annular cylindrical skirt, which serves to hold in position, radially on the outside, coil springs 16 which are also held radially on the inside by an annular retaining portion 17 of an internal guide ring 18.

The internal guide ring 18 has an internal transverse portion 208 in the form of a flat annulus, which is joined to the annular portion 17, of generally frusto-conical form, for retaining the springs 16, and which is itself extended externally by a transverse second portion 201 in the form of a flat annulus, which is parallel to the first transverse portion 208 and which is offset axially with respect to the latter towards the turbine wheel 4.

Figure 2:
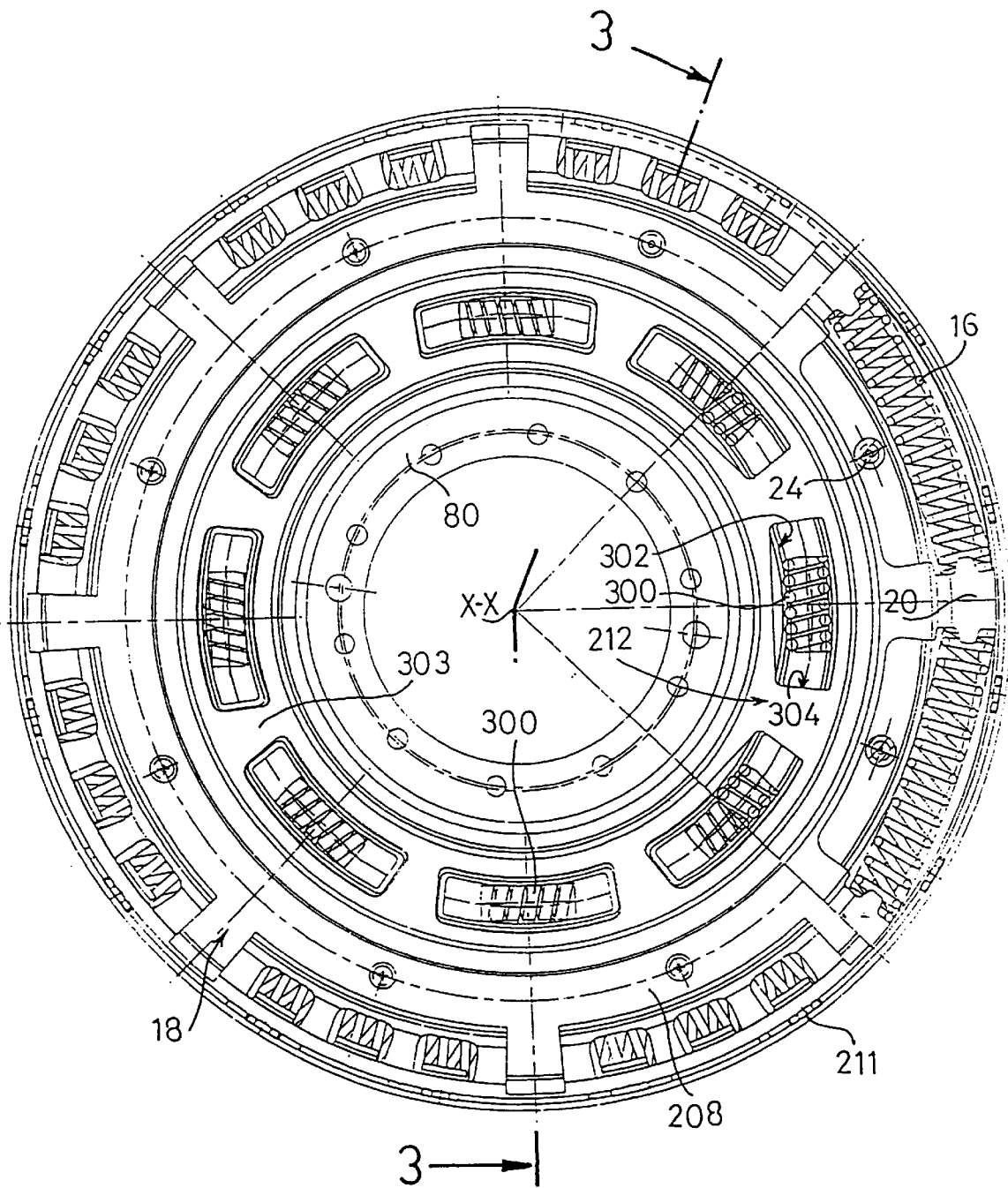
FIG. 2 is a view in axial elevation in the direction of the arrow F2 in FIG. 1, with one of the guide rings shown partly cut away.
Figure 3:
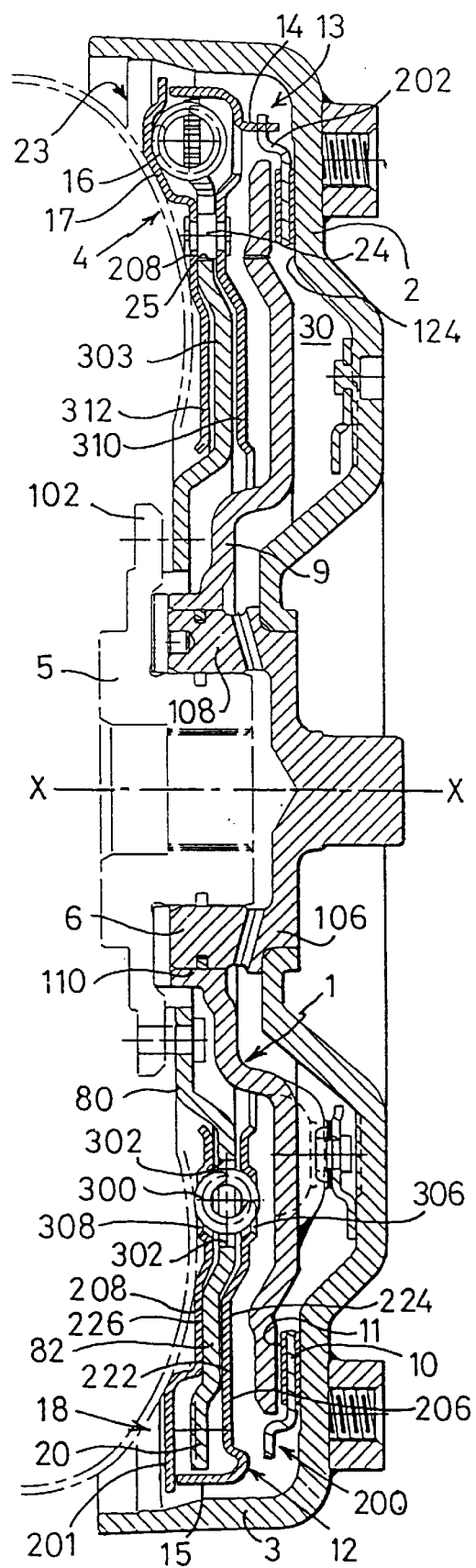
FIG. 3 is a view in cross section taken on the line 3—3 in FIG. 2.
Figure 5:
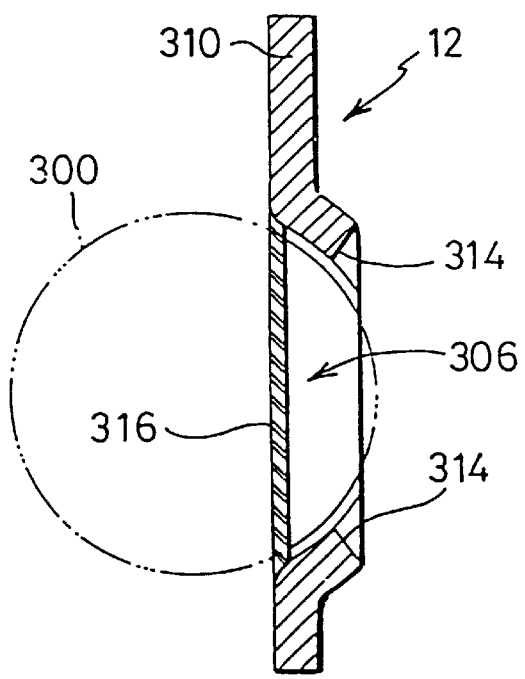
FIG. 5 is a scrap view in cross section taker on the line 5—5 in FIG. 4.

The transverse second portion 201 of the ring 18 has at its outer periphery notches 212, which in the embodiment shown in detail in FIGS. 2 and 5 consist of slots into which there penetrate axially-oriented shouldered tenons 211, which are formed at the free end of the annular portion 15 of the external guide ring 12 adjacent to the piston 9.

In a known way, by upsetting, in a seaming operation, the ends 216 of the tenons 211 in contact with the face of this second transverse portion 201 of the internal guide ring 18 facing towards the turbine wheel 4, a seamed connection of the tenon and mortice type is formed between the two guide rings, namely the external guide ring 12 and the internal guide ring 18.

The tenons 211 are formed in the free terminal edge of the annular portion 15, and they extend axially in the opposite direction from the drive lugs 14 which are offset internally towards the inside with respect to the said portion 15, which is disposed as close as possible to the wall 3 of the half shell, so as to locate the springs 16 more towards the outside, thereby improving performance.

The tenons 211 have a central recess for the purpose, in a known way, of facilitating flow of the material in contact with the face of the second portion 201 during the seaming operation.

The internal guide ring 12 is therefore robust. It will be noted that the lugs of the disc 10 are offset axially towards the turbine wheel 4 with respect to the main portion of the disc 10 carrying the friction liners 11, so as to decrease the length of the lugs 14, reduce axial size, and avoid any interferences.

The guide rings 12 and 18 are secured together at their inner periphery by means of short boss members 24.

The rings 12 and 18 are disposed axially on either side of a radial plate 19, which is provided with circumferential apertures 25, through which the boss members 24 extend with a circumferential clearance.

For this purpose, the external guide ring 12 has a transversely oriented annular portion 222 which is adjacent to the transverse surface 224 of the radial plate 19 and in facing relationship with it, while the transverse first portion 208 of the radially oriented internal guide ring 18 is adjacent to the surface 226 of the disc 18 adjacent to the turbine 4.

At its outer periphery the radial plate 19 has radial lugs 20 which define engagement portions for the circumferential ends of the circumferentially acting springs 16.

The lugs 20 (FIG. 1) carry circumferential fingers for holding the coil-type springs 16, with the said fingers penetrating into the interior of the springs 16 that extend between two lugs 20.

The internal guide ring 12 and the external guide ring 18 are provided with mutually facing press-formed elements 230 and 232 respectively, for engagement with the circumferential ends of the springs 16, the lugs 20 being able to penetrate between the press-formed elements, which stiffen the rings 12, 18.

Thus, thanks to the first set of circumferentially acting coil springs 16, which are referred to as first order springs, the disc 10 is elastically coupled to the radial plate 19 to give good absorption of vibrations.

The radial plate 19 is secured by riveting, or by welding in another version, to the hub plate 102 of the splined hub 5, at the same time as the turbine wheel 4 which for this purpose has lugs (not shown) at its outer periphery. The radial plate 19 is secured by means of its internal radial portion, in the form of a flat annulus 80 which lies in substantially the same plane as the lugs 20 and which is offset axially towards the turbine wheel 4 with respect to the outer radial portion, in the form of a flat annulus 82, through which the boss members 24 extend.

With the exception of the seals and the friction liners 11, the components of the hydrokinetic coupling apparatus are of metal, being typically in the form of steel pressings apart from the springs 16.

Thus, the lock-up clutch 1 includes a torsion damper 23 which is fitted, in the axial sense, mainly between the turbine wheel 4 and the wall 2 at the outer periphery of the first shell 2, 3, with an input part consisting of the ring 12 disposed radially outwards of the piston 9 and friction liners 11, the damper consisting of the guide ring 12 in the form of a half shell, the coil springs 16, and an output part consisting of the radial plate 19.

The output part 19 is coupled in rotation to the turbine wheel 4, and more precisely to the splined hub 5 of the latter, while the input part 12 is coupled in rotation to the disc 10 which projects radially with respect to the piston 9. The input part 12 is thus coupled disengageably, via the disc 10 and the liners 11, to the driving shaft. The disc 10 with its friction liners 11 is arranged to be gripped axially and disengageably on the piston 9 and the facing portion of the inner surface 124 of the transverse wall 2, which constitutes a counter-piston. The disc 10 is thus coupled elastically to the splined hub 5 and to the turbine wheel 4.

It will be noted that the piston 9 is coupled in rotation to the transverse wall 2 of the first shell by means of tangentially oriented resilient tongues 40 which are spaced apart at regular circumferential intervals, and these tongues 40 enable the piston 9 to move axially.

For attaching the tongues to the piston 9, two-part fastening means are used such as to necessitate working on only one side of the piston 9, as is described in the document FR-A-2 726 620, to which reference can be made.

In the event of relative rotation between the input part consisting of the ring 12 and the output part consisting of the plate 19, the circumferentially acting springs 16 are compressed, so as to permit this relative displacement to take place.

It will be recalled that by causing a variation to take place in the pressure within the chamber 30 fed through the sleeve and the driven shaft, the liners 11 can be gripped in such a way as to avoid, after the vehicle has been started, any sliding movements between the turbine and impulse wheels.

In one known design, the torsion damper 23 includes a second set of circumferentially acting springs 300, or so-called second order springs.

The springs 300, of which there are eight in this example, are coil-type compression springs, all of which are disposed circumferentially on the same diameter, this diameter being smaller than the diameter on which the boss members 24 are fitted, that is to say the second order springs 300 are located generally radially inwardly with respect to the first order springs 16.

For this purpose, each spring 300 is received in a housing 302 in the form of a window which is formed in a central portion 304, in the form of a flat annulus, of the radial plate 19 which lies in a plane that is offset axially, towards the internal face 124 of the transverse wall 2, with respect to the plane of the lugs 20 and the inner radial portion 80 of the radial plate 19.

The circumferential length of each window 302 is bounded by these radially oriented, opposed lateral terminal edges 304.

As can be seen in particular in FIG. 2, the circumferential length of the window 302 is generally greater than the circumferential length of the corresponding spring 300.

In order to receive each spring 300 which extends axially on either side of the radial plate 19 out of its window 302, the associated outer guide ring 12 and inner guide ring 18 include pairs of associated windows 306 and 308. To this end, the external guide ring 12 and internal guide ring 18 each have a transverse inner portion in the form of a radially oriented flat annulus, 310, 312 respectively.

These flat portions 310 and 312 are parallel and adjacent to the radial plate, lying in facing relationship with the portion 303 of the radial plate 19 that includes the windows.

Figure 4:
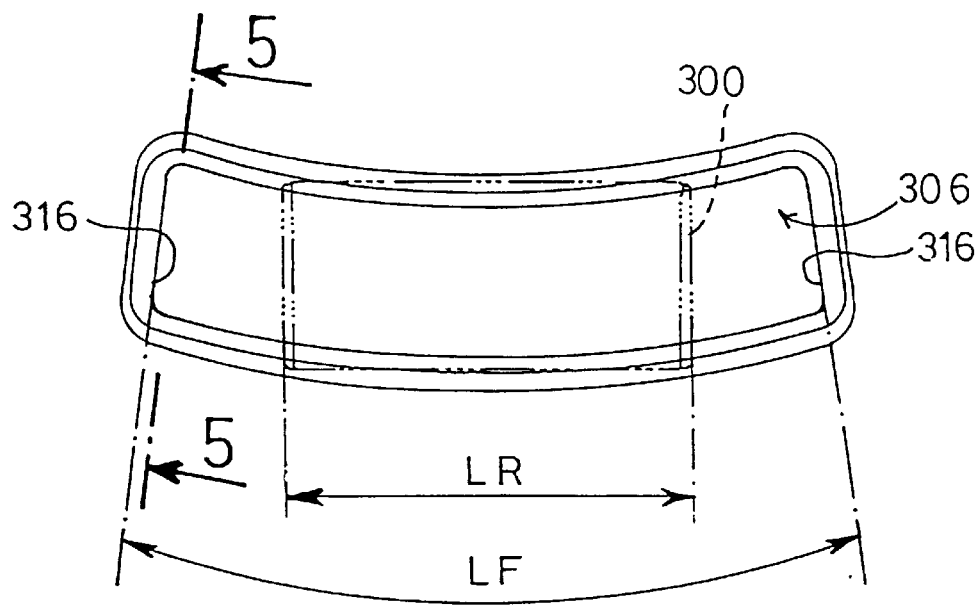
FIG. 4 is a scrap view on a larger scale, which shows the contour and the form of one of the windows for a second order spring in one or other of the two associated rings.

As can be seen in FIGS. 4 and 5, for example in the case of the external ring 12, the windows 306 are formed by stamping out and press-forming in the portion 310, and they are configured with curved longitudinal edges 314 so as to conform with the cylindrical outer profiles of the coil springs 300 which they receive.

The windows 306 and 308 thus have a robust contour which enables the springs 300 to be properly retained.

The circumferential length of each window 306, 308 is bounded by the respective opposed terminal lateral edges 316, 318 of the window.

The rings 12 and 18 are associated with each other through the boss members 24, each of which extends through an oblong passage 25 in the radial plate 19, so that the associated windows 306 and 308 are in facing relationship with each other, the windows 306 and 308 having circumferential lengths LF which are equal to each other, and also, in the embodiment of the invention shown in the drawings, a length which is equal to the circumferential length of the corresponding window 302 of the radial plate 19.

The advantage obtained by the design according to the invention will now be explained with reference to FIGS. 6A and 6B.

Figure 6A:
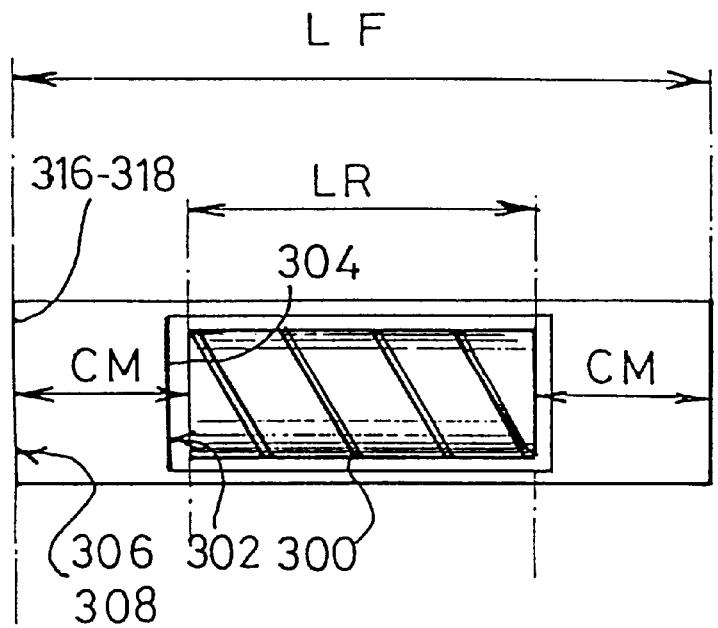
FIGS. 6A and 6B are two diagrams which, in FIG. 6B, illustrate the advantages that result from the design in accordance with the invention as compared with the state of the art which is shown in FIG. 6A.

In the design according to the prior art which is shown diagrammatically in FIG. 6A, the circumferential length of the windows 302 of the radial plate 19 is substantially equal to the length LR of the spring 300 at rest, while the windows 306 and 308 of the rings 12 and 18 have a window length LF which is generally greater than the length LR, so that a course of dead travel CM is obtained in both directions when, starting in the rest position shown in FIG. 6A, the input element consisting of the rings 12 and 18 is able to be displaced angularly in one direction or the other with respect to the output element consisting of the radial plate 19, through an angular course of travel corresponding to the circumferential dead travel CM, this taking place before the second order springs start to operate.

Figure 6B:
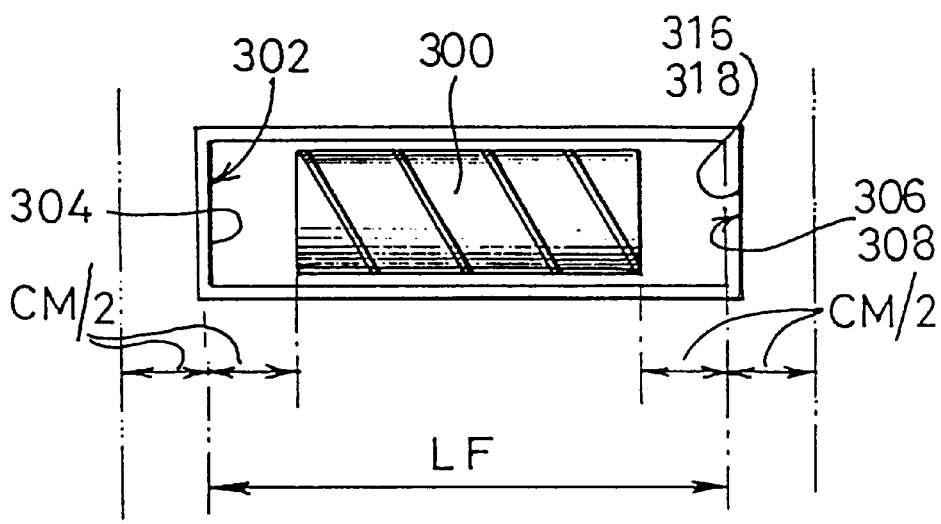

Thanks to the design according to the invention which is shown diagrammatically in FIG. 6B, the length of the windows 302 in the radial plate 19, and the windows 306 and 308 in the rings 12 and 18, are substantially equal to each other and have a common length LF which is greater than the length LR of the spring 300.

It is found that a circumferential dead travel CM in each direction is obtained which is equal to that in the version of the state of the art in FIG. 6A, by making windows 306, 308 such teat their length LF is reduced by a dead travel CM as compared with the state of the art. Thus, in order to obtain a common dead travel CM in both directions, it is enough to make the windows 302, 306, 308 such that their length is equal to LR+CM, whereas the solution according to the state of the art made it necessary to give the windows 306, 308 a length LF equal to LR+2CM.

It will be noted that the whole contour of the windows 306, 308 is curved.

In another version, the torsion damper may consist of a friction clutch, the radial plate 19 being fixed to a hub which is splined internally so that it can be coupled in rotation with the input shaft of the gearbox, in the case of application to a motor vehicle.

A support disc, carrying a friction liner secured on each of its faces, is then secured by riveting to the guide ring 12, which then has no drive lugs.

The liners are arranged to be gripped between the pressure and reaction plates of the clutch, which are rotatable in that case with the crankshaft of the engine of the vehicle. For more detail, reference should for example be made to the document EP-A-0 286 213 (U.S. Pat. No. 5,004,088).

What is claimed is:

1. A torsion damper (23) comprising an input element (12, 18) and an output element (19) coaxial with each other and rotatable with respect to each other against the action of at least one compression spring (300), in which each of two adjacent, radially oriented, transverse parts (310–312, 303), associated with the two elements that comprise the input element (12, 18) and output element (19), includes a housing (306–308, 302) that receives the spring (300), the opposed ends of which are arranged to cooperate with end abutment surfaces (316–318, 304) that bound the two housings so as to act between the two elements, characterised in that the length (LF) of each of the two associated housings (306–308, 302), separating the opposed end abutment surfaces of the housing, is greater than the length (LR) of the spring (300) at rest.

2. A torsion damper according to claim 1, characterised in that the lengths (LR) of the two housings (306–308, 302) associated with each other are equal.

3. A torsion damper according to claim 1, characterised in that the two adjacent parts (310–312, 303) are two radially oriented, transverse, substantially flat parts, in that each housing (306–308, 302) is a window formed in the corresponding flat portion of the element, and in that the said end abutment surfaces (316–318, 304) consist of the opposed terminal lateral edges of the window.

4. A torsion damper according to claim 1, characterised in that the spring (300) is a coil type compression spring.

5. A torsion damper according to claim 1, characterised in that the said two adjacent parts are respectively part of the input element (12, 18) and output element (19), and in that the housings are circumferentially oriented housings which receive a circumferentially acting spring.

6. A torsion damper according to claim 5, characterised in that it includes a set of circumferentially acting springs (300) arranged substantially on a common diameter, and each of which is received in said two associated housings (302, 306–308).

7. A torsion damper according to claim 6, characterised in that the input element comprises at least one guide ring (12, 18) which retains the circumferentially acting springs (300) in position radially and which is coupled to the driven element of a lock-up clutch, and in that the output element comprises a radial plate (19) which is coupled in rotation to the driving element of the lock-up clutch.

8. A torsion damper claim 7, characterised in that the input element comprises two complementary guide rings (12, 18), each of which includes a radially oriented transverse portion (310, 312), in that the two said portions are arranged symmetrically on either side of a corresponding radially oriented transverse portion (303) of the radial plate (19), and in that the said two portions of the guide rings include facing windows (306, 308) which, being associated in pairs, constitute a housing of the input element (12, 18) which receives a circumferentially acting spring (300), which is itself received in a housing (302) of the portion (303) of the radial plate (19) that extends between the two rings.

9. A torsion damper claim 8, characterised in that the two complementary rings (12, 18) include means (24) for coupling them together in rotation, and in that the circumferentially acting springs (300) are arranged on a diameter which is substantially smaller than the diameter on which the means (24) coupling the two rings together in rotation are located.

10. A torsion damper according to claim 6, characterised in that the torsion damper acts between the driving element and the driven element of a hydro-kinetic coupling apparatus.

* * * * *